United States Patent [19]

Finney

[11] 4,219,088

[45] Aug. 26, 1980

[54] LOAD INDICATOR

[76] Inventor: Orville H. Finney, 14850 SW. 280th St., #32 Innkeeper Ln., Homestead, Fla. 33032

[21] Appl. No.: 950,783

[22] Filed: Oct. 12, 1978

[51] Int. Cl.² .................................. G01G 19/08
[52] U.S. Cl. .......................................... 177/138
[58] Field of Search ............................ 177/137, 138

[56] References Cited

U.S. PATENT DOCUMENTS

| | | | |
|---|---|---|---|
| 1,407,078 | 2/1922 | Murray | 177/137 |
| 2,996,697 | 8/1961 | Ellis et al. | 177/137 X |
| 3,648,790 | 3/1972 | Bishop | 177/137 |
| 3,857,093 | 12/1974 | Green | 177/137 X |
| 4,106,579 | 8/1978 | Hayes, Sr. et al. | 177/137 |

*Primary Examiner*—George H. Miller, Jr.

[57] ABSTRACT

A weight load indicator for registering the weight of a load as it is applied to a truck, the truck includes a frame and a wheel suspension connected to the frame. The load indicator device comprises a housing having a piston rod chamber fixed to the frame, a piston rod with a first and a second end engage the chamber with the second end extending from the chamber and the second end is within the path of movement of the truck suspension as a load is applied to the truck. The first end of the rod is free to move toward the frame within the chamber in response to the load applied to the truck. A sensor is mounted on the housing. The sensor includes a swingable arm within the path of movement of the first end of the rod. An electrical circuit, including a gauge, is provided in series with the sensor for detecting movement of the swingable arm as the first end of the rod moves upward toward the frame within the chamber. In this manner, the user is able to determine the weight of the load applied to the truck.

6 Claims, 6 Drawing Figures

LOAD INDICATOR

FIELD OF THE INVENTION

This invention relates to an apparatus for use in registering a weight load. More specifically, this device is used to register a weight load applied to a truck having a frame and a wheel suspension connected to the frame.

BACKGROUND OF THE INVENTION

In the past there have been many devices for weighing loads. There have been devices for weighing truck loads such as those used by federal and state authorities for regulating commerce on state and federal highways.

State and federal authorities generally use a device wherein the truck carrying the load is rolled over a weighing portion and the weight of the load and the weight of the truck are registered on the scale. This type of weighing device is generally quite expensive and beyond the means for the small trucking firm. Hence, the small trucking firm is left without a practical means for weighing their trucking loads in order to comply with state and federal law.

However, it should be noted that if the federal or state authorities find a truck which is, by law, overloaded stiff fines and penalties may be imposed upon the driver and/or firm.

Applicant's device solves this problem by providing an inexpensive and accurate means for weighing a truck load.

The user of applicant's device merely sits in the cab of his truck as the truck is loaded and stops loading when the desired load weight is reached. In this way, the small trucking firm can determine accurately and inexpensively his weight load in order to avoid the stiff fines and penalties imposed by the state and federal authorities.

OBJECT OF THE INVENTION

The object of this invention is to provide an inexpensive and accurate means for registering the weight of a load applied to a truck in order to avoid state and federal fines and penalties.

In accordance with these and other objects which will become apparent hereinafter, the instant invention will now be described with reference to the accompanying drawings in which:

DESCRIPTION OF THE PREFERRED EMBODIMENT

Figure 1:
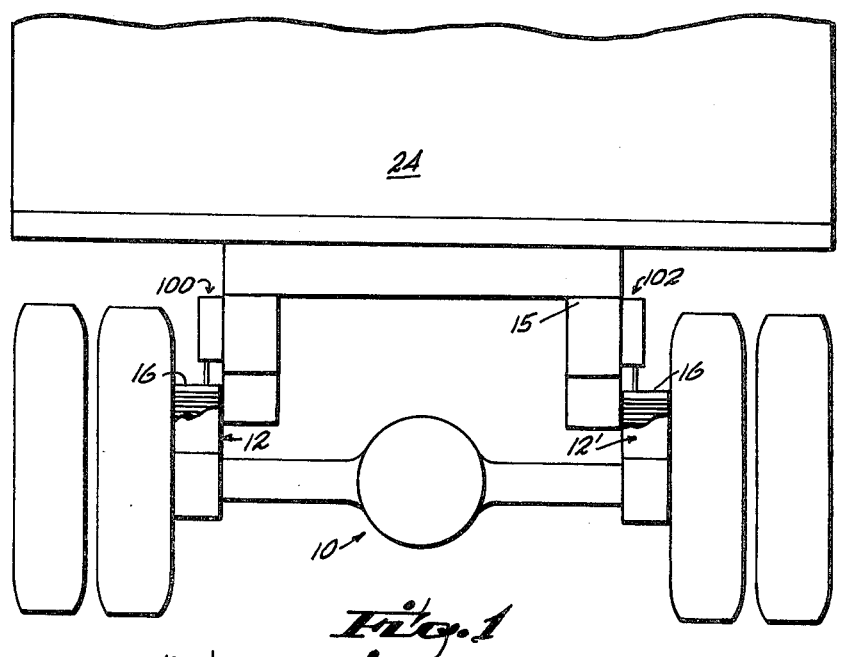
FIG. 1 is an end view of a truck equipped with the instant invention.
Figures 2, 3:
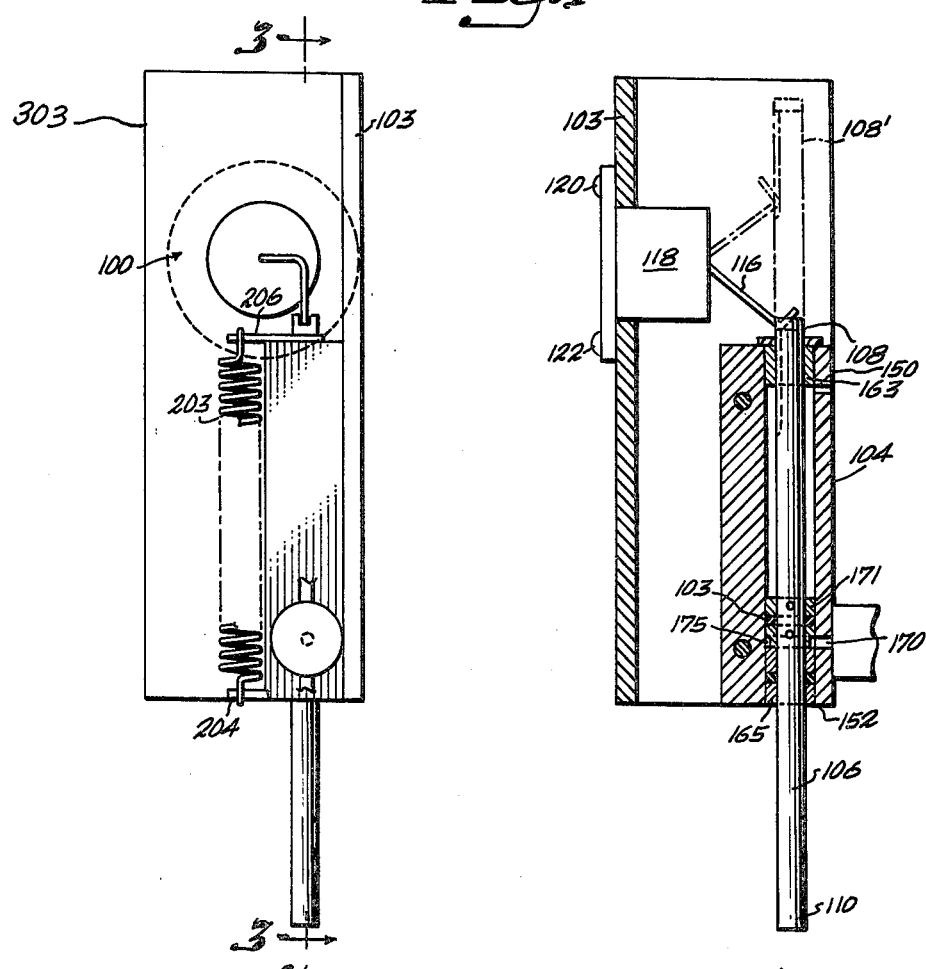
FIG. 2 is a side elevation view of one of the components of the instant invention.
FIG. 3 is a view in cross section taken on the plane indicated by the line 3—3 of FIG. 2 and looking in the direction of the arrows.

Referring to the drawings wherein like reference characters designate like or corresponding parts throughout the several views and referring particularly to FIG. 1, there is shown the back of a truck with an axle assembly generally designated by the numeral 10 which is provided with springs 12 and 12' which are held together by a suitable band such as 16 with respect to a frame 15 to which there is mounted a load carrier 24. The instant invention comprises a pair of sensor means 100 and 102, one of which is shown in FIGS. 2 and 3. Each sensor means, such as 100, comprises a support 303 which is suitably secured, as by welding, to a predetermined position to the frame 15, as shown in FIG. 1. With reference to FIG. 3 there is shown the support or bracket 303 which includes a cylinder 104 for a piston 106 which is slidable therein. The piston includes a rod having an upper end 108 extending into space protectively within the bracket and a lower end 110 which extends below the bracket. The lower end, in use, is in engagement with the spring band 16 as shown in FIG. 1, or, if not in engagement with the spring band, with some other portion of the suspension that moves in response to gravity loads. The upper end is free to move upwardly as shown by the dotted lines and indicated by the numeral 108'. Within the path of travel, determined by guide means, there is a sensor arm 116 which is swingably connected to a sensor 118 which is of the type commercially available. The sensor 118 is mounted as by the bolts 120 and 122 to the bracket 103 so that its arm is in the path of travel of the rod. The cylinder 104 includes an upper end 150 and a lower end 152 which define a pair of aligned holes sized for sliding axial movement of the piston 106. The upper end of the cylinder 150 within which the piston travels is closed by rod guide means or a plug 163, as is the lower end by rod guide means or plug 165. In the lower end of the side wall of the cylinder, there is an opening 170 which is in fluid communication with an air pressure line 172. The piston is provided with a head 171 sized to mate with the cylinder and this head is captivated between the closed upper and lower ends of the chamber. Spring means 203 are provided to normally urge the piston into the position shown in FIGS. 2 and 3. An annular groove is provided in the head of the piston to accommodate an O-ring 103 and, as shown in the drawings, the head is undercut as at 175 to respond to air pressure by vertical movement when air pressure is introduced through the line 172 to move it upwardly.

In use, when a force is applied to the lower end of the rod 110, as by a load being applied in the cargo carrier 16, it will move the rod upwardly causing the upper end to move the sensor arm 116. The upper end is provided with a longitudinally extending guide slot to captivate the terminal end of the sensor arm 116 for sliding movement therealong.

Figure 5:
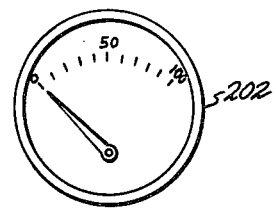
FIG. 5 is a front elevational view of a gauge used to indicate the status of the loading of the truck equipped with the instant invention.
Figure 6:
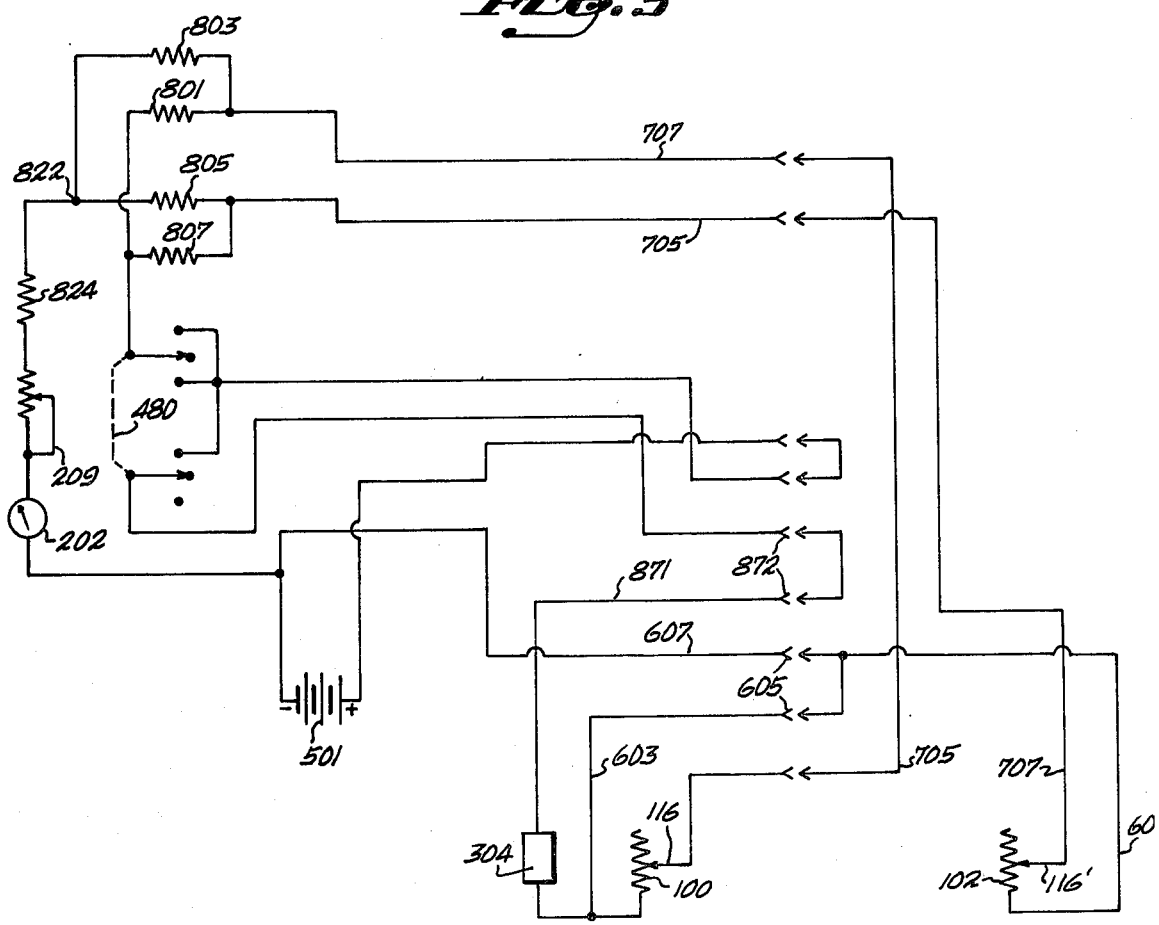
FIG. 6 is an electrical diagram illustrating a suitable electrical arrangement for operating the parts of the instant invention.

Through an electrical circuit, shown in FIG. 6, this movement is translated into a signal which is communicated to a gauge 202 shown in FIG. 5 which is mounted within the cab of the tractor. Normally by spring means 203 which engage the bracket at the lower end 204 and a clip 106 secured to the rod, the rod is urged into the position shown in FIGS. 2 and 3. It will be appreciated that as load is applied, when the truck is being loaded, the rod will move upwardly in response to the increase in the load causing the electrical signal which can be read in the cab and, simultaneously, storing energy in the spring to restore the piston to the normal position when the load is removed.

In this manner a person loading the truck may, on reference to the guage determine the load weight on the truck so as to avoid overloads and the attendant fines. It will be seen that a sensor is provided on both of the rear wheels in accordance with the above-described description on reference to the sensor 100 shown in FIGS. 2 and 3.

Figure 4:
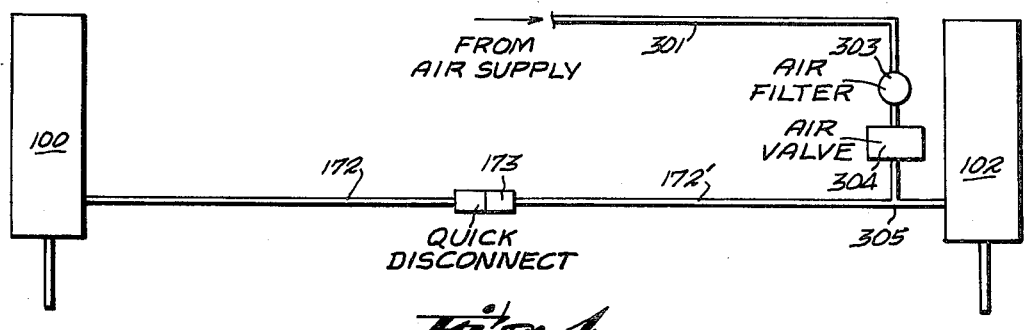
FIG. 4 is a schematic view illustrating diagramatically the compressed air line utilized to deactivate the instant invention.

When the truck is moving down the road, i.e., after loading, there will be repeated application of forces on the wheels caused by bumps or the like. For this reason, it is desired that the piston rod be stabilized so as not to continue to transmit signals. For this reason, after the truck is loaded, the rod 106 is raised within the cylinder to an out of the way position. To do this, air pressure is supplied through the conduit 172 at the lower right of FIG. 3. This drives the piston head upwardly within the cylinder to an upward position. Referring to FIG. 4, it is seen that the air is supplied through a conduit 301 from the truck's supply through a filter 303 and conventional solenoid operated air valve 304 to a T connection as at 305 so as to supply components of equal air pressure to the sensor units 100 and 102 which are joined together by a pair of conduits 172 and 172' at a quick disconnect joint 173. In each of the similarly constructed sensors, the air will enter through the port 170 and move the piston to an out of the way position, that is, with the rod lower end 110 being moved upwardly. When the air pressure is withdrawn, the spring 203 will then move the rod downwardly into the position shown in FIGS. 2 and 3 for loading.

FIG. 6 is a conventional electrical diagram in which a control switch on the dash is provided and designated in the electrical diagram by the numeral 480. The circuit is energized by the truck battery 501 so that the signal is seen at the guage 202 as sensed by the sensors 100 and 102. Each of the sensors, 100 and 102 are connected by conductors 601 and 603 through a plug as at 605 and through conductor 607 to the battery 501. Each of the sensor arms 116 and 116' are connected by conductors 705 and 707 to the guage 202. In each of these conductors 705 and 707 there is a resistor in series, 803 and 805 and, these resistors 803 and 805 which are in parallel with one another are connected in series at junction 822 with a protective resistor 824 to the guage. The guage 202 preferably includes a zero setting circuit 209 so that the guage may be adjusted to zero. The solenoid valve 304 is electrically controlled through conductor 871 and plug 872 to the master switch 480. Thus, when the switch 480 is operated, the air pressure is withdrawn, the spring means urge the rods into the position for loading and, the sensors sensing the increase in the load transmit the signals to the guage to inform the operator of the loading. It will be seen that each of the resistors 803 and 805 are protecyted by resistors 801 and 807.

It is thus seen that there is provided a simple and inexpensive installation to guard against overloading which may be installed on conventional equipment.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all apparatus and articles.

What is claimed:

1. For registering the weight of a load as it is applied to a truck having a frame, and a wheel suspension connected to the frame, a load indicator device comprising:

a housing fixed to the frame and defining a piston rod chamber, a piston rod in the chamber having a first and a second end extending from the chamber, the first end of the rod being within the path of movement of the truck suspension as the load is applied to the truck, and the rod being free to move toward the frame in response to the applied load, air valve means attached to the chamber, the piston rod having first and second ends, the second end including an undercut rod head, the rod head including an annular groove with an O-ring, the chamber includes an upper and a lower end, both ends having guide means thereby closing the chamber when the rod is in the chamber, the rod head is captivated between the closed upper and lower ends of the chamber, spring means are provided to normally urge the piston rod's first end to an extended position beyond the chamber, the electrical circuit includes solenoid means for opening and closing the air valve, when the valve is opened, air is allowed into the chamber applying pressure to the O-ring and piston rod head, thereby forcing the rod upward and out of contact with the truck suspension, a sensor mounted on the housing, having a swingable arm in the path of movement of the first end of the rod, and electrical means including a guage in series with the sensor for detecting movement of the swingable sensor arm, thereby enabling the user to determine the weight of the load applied to the truck.

2. A load indicator device as in claim 1 wherein a plurality of the devices are attached to the frame of the truck such that each of their respective piston rods are within the path of movement of the truck suspension.

3. A load indicator device as in claim 2 wherein the circuit includes averaging means.

4. A load indicator device as in claim 1 wherein the second end of the rod has a notch sized for mating egagement with the swingable sensor arm thereby captivating the sensor arm within the notch.

5. A load indicator device as in claim 4 wherein two such devices are attached to the frame of the truck such that each of their respective piston rods are within the path of movement of the truck suspension.

6. A load indicator device as in claim 5 wherein the circuit includes averaging means thereby enabling the user to obtain an accurate reading even when one side of the truck becomes heavier than the other side of the truck because of unequal loading.

* * * * *